Figure 1:
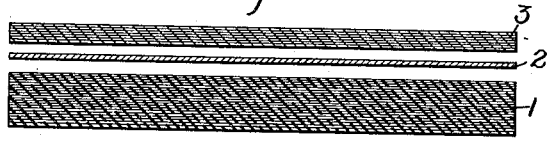

G. R. COX.
COMPOSITE PLATE AND METHOD OF MAKING SAME.
APPLICATION FILED NOV. 28, 1919.

1,437,094.

Patented Nov. 28, 1922.

WITNESSES:
J. A. Helsel
W. F. Woodman.

INVENTOR
George R. Cox
BY
Wesley G. Carr
ATTORNEY

Patented Nov. 28, 1922.

1,437,094

UNITED STATES PATENT OFFICE.

GEORGE R. COX, OF JERSEY CITY, NEW JERSEY, ASSIGNOR TO WESTINGHOUSE ELECTRIC & MANUFACTURING COMPANY, A CORPORATION OF PENNSYLVANIA.

COMPOSITE PLATE AND METHOD OF MAKING SAME.

Application filed November 28, 1919. Serial No. 341,020.

*To all whom it may concern:*

Be it known that I, GEORGE R. COX, a citizen of the United States, and a resident of Jersey City, in the county of Hudson and State of New Jersey, have invented a new and useful Improvement in Composite Plates and Methods of Making Same, of which the following is a specification.

My invention relates to composite plates and, more particularly, to plates formed of superimposed layers of fibrous sheet material impregnated with a binder, such as shellac, which is adapted to harden under the application of heat and pressure.

The primary object of my invention is to provide a method which shall facilitate the production of plates in which a binder, such as shellac, is employed.

Difficulty has been experienced in the manufacture of composite plates formed of fibrous sheet material impregnated with a shellac because shellac has a tendency to cause the material to adhere to the surface of the pressure platens when the assembled plate is subjected to heat and pressure in a suitable mold or press. One object of my invention, therefore, resides in the provision of a method of constructing plates, of the above designated character, in such manner that the danger of the material adhering to the pressure platens shall be obviated.

With these and other objects in view, my invention will be more fully described, illustrated in the drawings, in the several views of which corresponding numerals indicate like parts, and then particularly pointed out in the claims.

Figure 2:
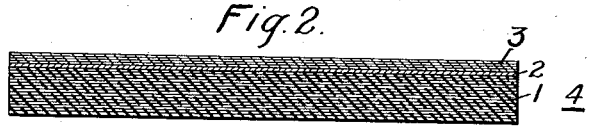
Figure 3:
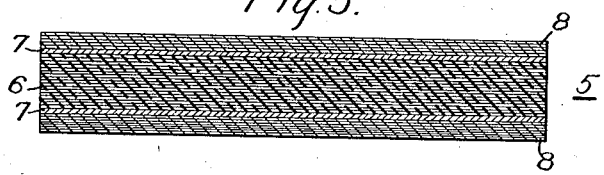

In the drawings, Fig. 1 is a sectional view of the various parts which are assembled to provide a plate in accordance with my invention; Fig. 2 is a similar view illustrating a finished plate constructed by my invention, and Fig. 3 is a view similar to the preceding figures, illustrating a modification of my invention.

Composite plates, comprising superimposed layers of fibrous material impregnated with a suitable binder, are widely employed for various electrical purposes, such as insulation, and it has been found that a composite plate formed of superimposed layers of fibrous material impregnated with shellac is exceptionally satisfactory as an insulator. The shellac imparts a dielectric strength to the treated material which is highly desirable and it also ensures relatively great mechanical strength in the finished plate. Great difficulty has been experienced, however, in forming composite plates in which shellac was employed, as a binder, because the treated material tends to adhere to the pressure surfaces of the press or mold in which the material is compacted and cured.

In practising my invention, I may construct a plate by employing fibrous material impregnated with shellac and by stacking a plurality of layers of suitable dimension to form a plate of the desired thickness. A sheet of untreated material may then be superimposed upon the stacked layers of shellac-treated material and additional sheets of fibrous material impregnated with a binder, such as a phenolic condensation product, may be superimposed upon the untreated material. The material thus assembled may be disposed in a suitable press or mold and subjected to heat and pressure to compact the material and form a unitary body. A phenolic condensation product possesses properties similar to the shellac, with respect to imparting desirable dielectric strength to fibrous material treated therewith and to also ensure relatively great mechanical strength in the finished article. A phenolic condensation product, however, does not have the tendency to adhere to the pressure platens and, for this reason, a smoother and more highly polished surface may be obtained in the composite plate. Furthermore, the pressure platens are not impaired by the adhesion experienced when the shellac is employed, and the cured plate is, therefore, easily removed from the press or mold.

In Fig. 1 is shown a plurality of sheets of fibrous material 1 which are impregnated with shellac and stacked to form a plate of suitable thickness. A sheet of untreated material 2 may be superimposed upon the stacked layers of shellac-treated material 1, and additional layers 3 of fibrous material, impregnated with a phenolic condensation product, may be superimposed upon the untreated sheet 2. The fibrous sheet material employed, which is impregnated, either with shellac or with a phenolic condensation product, may be any suitable fibrous material, such as paper, duck or muslin, depending upon the characteristics most desired in the finished plate. However, the layers 1 and 3 are preferably of similar material, while the untreated sheet 2 may be a fibrous material which is very thin and absorbent, such as Japan paper, which also possesses a long fiber and is very smooth and soft in texture. The materials impregnated with the shellac and the phenolic condensation product, as binders, may be assembled as above described and then disposed in a suitable press or mold and subjected to heat and pressure to compact the material to form a unitary body.

In Fig. 2 is shown a finished plate 4 comprising the body portion formed of the shellac-treated material 1, the untreated Japan paper 2 and the surface material 3, which is impregnated with a phenolic condensation product. The upper layers which are impregnated with a phenolic condensation product, not only facilitate the removal of the cured plate from the mold but also ensure a nicely finished surface which is desirable when a decorative appearance is required. The various materials are united in the mold or press to form a hard and unitary body which may be machined or drilled to provide the requisite shape or openings desired.

In Fig. 3 is shown a plate 5 which is constructed in substantially the same manner as the plate 4, shown in Fig. 2. In this instance, however, the plate is composed of a central portion 6 formed by stacking a plurality of layers of sheet material impregnated with shellac, untreated sheets of material 7 disposed upon the upper and lower surfaces thereof, and outer layers 8 of fibrous material impregnated with a phenolic condensation product. The plate thus assembled is subjected to heat and pressure, in a suitable press or mold, to compact the material and to form a unitary body, as above described. A highly polished surface is, therefore, obtained on both the upper and lower surfaces of the plate because of the fact that the additional layers of material, impregnated with a phenolic condensation product, are disposed upon both sides of the assembled plate.

The employment of the untreated sheet of material, which is disposed between the layers of material impregnated with shellac and the material impregnated with a phenolic condensation product, is important because it ensures a good union between the layers of the materials impregnated with the different binders. If the layer of untreated sheet material is not employed, the material treated with a phenolic condensation product does not adhere to the material treated with the shellac to a sufficient degree to ensure the requisite mechanical strength in the finished plate.

Although I have specifically described a method of constructing composite plates and set forth that shellac and a phenolic condensation product are employed as binders therefor, it will be appreciated that the method may be found applicable to form composite plates impregnated with other binders possessing similar characteristics to those mentioned. It is obvious also, that the method of constructing the plates is subject to minor changes within the scope of my invention, and I desire, therefore, that no limitations shall be imposed except such as are indicated in the appended claims.

I claim as my invention:—

1. A composite plate comprising a body portion of fibrous material impregnated with a hardened binder, fibrous material impregnated with a different hardened binder secured upon the body portion, and a layer of fibrous material interposed between the body portion and the material secured thereon.

2. A composite plate comprising a body portion of fibrous material impregnated with hardened shellac, fibrous material impregnated with a hardened phenolic condensation product secured upon the body portion, and a layer of fibrous material interposed between the body portion and the material secured thereon.

3. A composite plate comprising a body portion of superimposed layers of fibrous material impregnated with hardened shellac, fibrous material impregnated with a phenolic condensation product secured upon the body portion, and a layer of fibrous material interposed between the body portion and the material secured thereon.

4. A composite plate comprising a body portion of superimposed layers of fibrous sheet material impregnated with hardened shellac, layers of fibrous sheet material impregnated with a hardened phenolic condensation product secured upon the body portion, and a layer of fibrous sheet material interposed between the body portion and the material secured thereon.

5. A composite plate comprising a body portion of fibrous material impregnated with hardened shellac, fibrous material impregnated with a hardened phenolic condensation product secured upon the upper and lower surfaces of the body portion, and layers of fibrous material interposed between the body portion and the material secured upon its upper and lower surfaces.

6. A composite plate comprising bodies of fibrous material indurated by different hardened binders and an interposed layer of fibrous material indurated with both the binders and joining the bodies together.

7. A method of forming composite plates that comprises interposing an absorbent sheet of fibrous material between bodies of fibrous material impregnated with different binders in an inert state, and subjecting the assembled materials to such conditions of pressure and temperature as to first render the binders active and cause them to impregnate the interposed sheet and to then harden the binders.

8. A method of forming composite plates that comprises impregnating fibrous material with shellac, disposing a layer of untreated material upon the surface of the shellac treated material, disposing fibrous material impregnated with a phenolic condensation product upon the untreated material and subjecting the body thus assembled to such pressure and temperature conditions as are requisite to compact the material and to harden the binders.

9. A method of forming composite plates that comprises impregnating layers of fibrous sheet material with shellac, stacking a plurality of the treated layers to form a plate of suitable thickness, disposing a layer of untreated fibrous material upon one surface of the stacked material thus assembled, disposing fibrous material impregnated with a phenolic condensation product upon the layer of untreated material and subjecting the body thus assembled to heat and pressure to compact the material and to form a unitary body.

10. A method of forming composite plates that comprises impregnating layers of fibrous sheet material with shellac, stacking the layers of shellac-treated material to form a plate of suitable thickness, disposing a layer of untreated material upon one surface of the stacked material, disposing fibrous material impregnated with a phenolic condensation product upon the untreated material and subjecting the body thus assembled to heat and pressure to compact the material and to form a unitary body.

11. A method of forming composite plates that comprises impregnating layers of fibrous sheet material with shellac, stacking a plurality of layers of the shellac-treated material to form a plate of the desired thickness, disposing layers of untreated fibrous sheet material upon the upper and lower surfaces of the stacked material, disposing fibrous material treated with phenolic condensation product upon the layers of untreated material and subjecting the body thus assembled to heat and pressure to compact the material and to form a unitary body.

12. A method of forming composite plates that comprises impregnating layers of fibrous sheet material with shellac, stacking a plurality of the layers of treated material to form a plate of the desired thickness, disposing a layer of untreated fibrous sheet material upon the upper and lower surfaces of the stacked material, disposing a plurality of layers of fibrous sheet material impregnated with a phenolic condensation product upon the layers of untreated material and subjecting the body thus assembled to heat and pressure to compact the material and to form a unitary body.

In testimony whereof, I have hereunto subscribed my name this 24th day of November, 1919.

GEORGE R. COX.